UNITED STATES PATENT OFFICE.

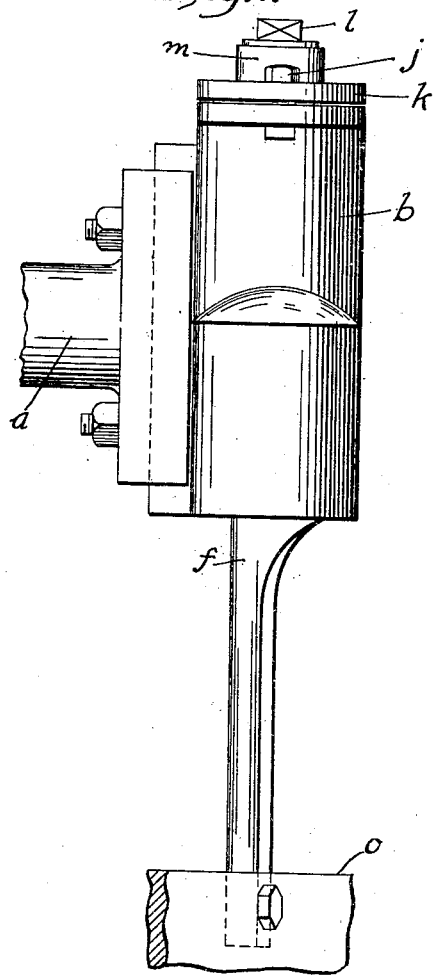
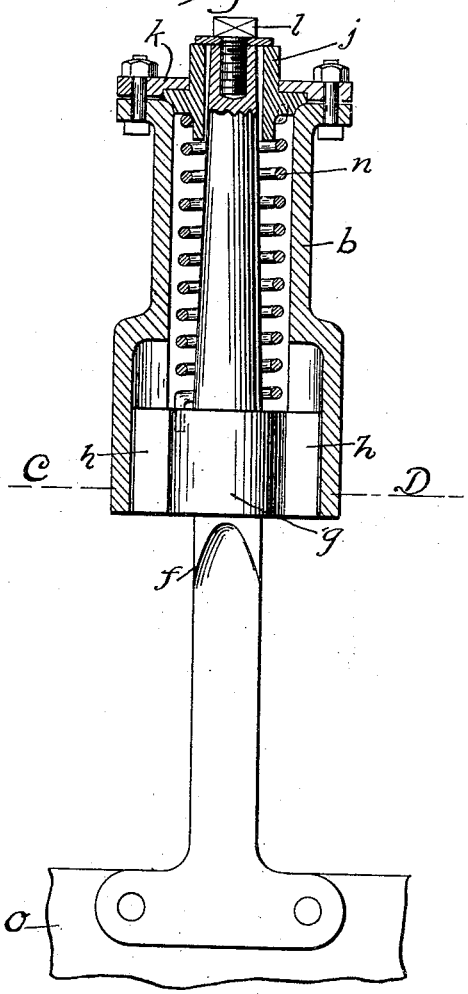
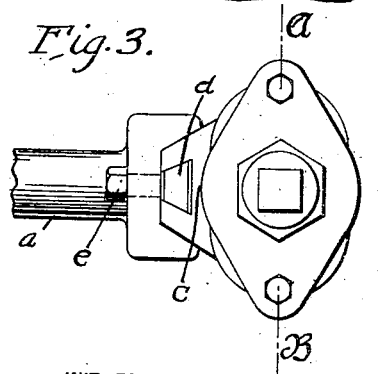
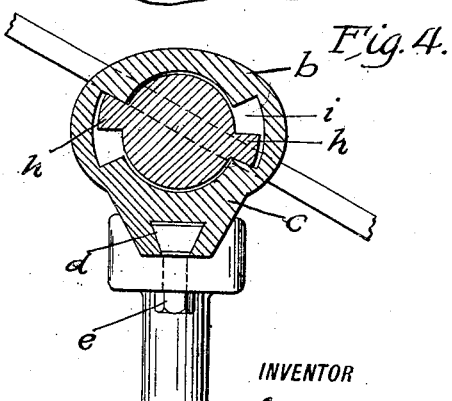

GUSTAV EIRICH, OF HARDHEIM, GERMANY.

MIXING-MACHINE.

958,608.  Specification of Letters Patent.  Patented May 17, 1910.

Application filed January 14, 1910. Serial No. 538,008.

*To all whom it may concern:*

Be it known that I, GUSTAV EIRICH, a subject of the German Emperor, and resident of Hardheim, Baden, Germany, have invented certain new and useful Improvements in Mixing-Machines, of which the following is a full, clear, and exact specification.

This invention relates to an improved mixing machine for earthy and mineral materials, which is designed to overcome the defects incidental to the usual rigid connection of the shovel and driving mechanism, which defects consist in that between the lower edge of the shovel and the bottom of the trough, or between the blade of the shovel and the vertical wall of the trough frequently, stones or the like are clamped, and thus impair the working of the machine.

In my invention the shovel is secured on a holder, which with its upper part is arranged in the interior of a casing in such a way that it is allowed, as far as it is not limited therein, by two oppositely disposed projections thereon, to exert a longitudinal movement in axial direction, as well as a rotary movement, while it is returned into its initial position by a spiral spring connected therewith, and acting in two directions. The employment of two oppositely disposed projections is essential for the invention, as a one-sided clamping of the holder is avoided and the axial movement of the same is considerably facilitated.

The connection of the casing with its supporting bracket is effected by screws which are movably located in a dovetail-shaped extension of the casing, whereby an exact adjustment of the shovel as well as an easy removal of the casing can be effected upon the screws being slightly loosened. This construction is of considerable advantage over the known arrangements, in which the supporting bracket and the shovel holder are connected by a stirrup screw, so that each time when the shovel holder is to be removed for the convenient exchange of the mixing shovels, which must frequently be removed, said stirrup screw had to be removed which always was accompanied by a considerable loss of time and great inconvenience.

The accompanying drawing shows a preferred example of the improved arrangement.

Figure 1 is a side view, and Fig. 2 a plan of the same, while Fig. 3 shows a longitudinal section on the line C—D of Fig. 2, and Fig. 4 a cross-section on the line A—B of Fig. 3.

On a bracket $a$ which is connected with the driving shaft, a casing $b$ is secured and guided by means of its extension $c$ in a corresponding recess of the bracket and kept in position thereon by screw $e$ mounted in the dovetail-shaped groove $d$. By this arrangement, an exact adjustment of the shovel $o$ and a quick disengagement of the connection between the casing and supporting bracket is obtained.

In the casing $b$, a bolt $f$, the lower part of which carries the shovel $o$, is so arranged that it can move in axial direction and have a partial rotation, so that the shovel can readily yield to any obstacle that may accidentally come between it and the bottom or wall of the trough and held therebetween. With this end in view, the holder has an enlarged portion $g$ which is provided with two opposite projections $h$ which are guided in recesses $i$ in the casing of about the double width of the projections. By the double arrangement of the projections, a secure guiding of the bolt in the casing and a proper position of the shovel is obtained, while a one-sided clamping or sticking in the recesses $i$, which might occur in the longitudinal movement of the bolt owing to the resistance of the shovel, is entirely avoided. That part of the bolt which lies above the enlarged portion $g$ is conical, and with its upper end is guided in a sleeve $j$ which by a ring $k$, is connected with the casing. To prevent the holder from falling out of the casing, it rests upon the sleeve $j$ with an intervening washer $m$, which latter is connected with it by a screw $l$. The conical part of the bolt is surrounded by a spiral spring $n$, which at one end is secured to the enlarged portion $g$, and at the other end to the sleeve $j$, and which tends to press the bolt down in the casing as well as to turn the same, so that the shovel after having passed any obstacles, is immediately returned into its initial position.

Having thus described my invention, what I claim is:—

1. In a mixing machine having a driving shaft, in combination a bracket secured to the driving shaft of the machine, a casing connected to said bracket, a shovel, a movable bolt secured within said casing, adapted to carry the shovel at its lower projecting end, and means for permitting a yielding of such bolt and shovel in axial as well as in a rotary direction, substantially as described, and for the purpose set forth.

2. In a mixing machine having a driving shaft, in combination a bracket secured to the driving shaft of the machine, a casing connected to said bracket, means to adjust said casing on the bracket, a shovel, a movable bolt secured within said casing, adapted to carry the shovel at its lower projecting end, and means for permitting a yielding of such bolt and shovel in axial as well as in a rotary direction, substantially as described, and for the purpose set forth.

3. In a mixing machine having a driving shaft, a bracket secured to the driving shaft of the machine, a casing adjustably connected with said bracket and provided at its lower end with two opposite recesses, a movable bolt secured within said casing, designed to carry the shovel at its lower projecting end, said bolt having a projection with two opposite projections guided in the recesses of said casing, said recesses being of about the double width of said projections, a fixed sleeve located at the top of said casing and designed to receive and guide the upper end of said bolt, means to prevent said bolt from falling out of said casing, and a spring surrounding said bolt, having one end fixed to said projection, and the other end to said sleeve, and designed to actuate said bolt in axial as well as in a rotary direction, substantially as described, and for the purpose set forth.

In testimony whereof I affix my signature in presence of two witnesses.

GUSTAV EIRICH.

Witnesses:
ERNEST L. IVES,
W. W. SCHMIDT.